United States Patent
Tomida et al.

(10) Patent No.: US 11,909,867 B2
(45) Date of Patent: Feb. 20, 2024

(54) KEY EXCHANGE SYSTEM, METHOD AND PROGRAM FOR GENERATING A SHARED KEY FOR SECURE COMMUNICATION

(71) Applicant: NIPPON TELEGRAPH AND TELEPHONE CORPORATION, Tokyo (JP)

(72) Inventors: Junichi Tomida, Tokyo (JP); Fumitaka Hoshino, Tokyo (JP); Akira Nagai, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 110 days.

(21) Appl. No.: 17/607,776

(22) PCT Filed: May 29, 2019

(86) PCT No.: PCT/JP2019/021377
§ 371 (c)(1),
(2) Date: Oct. 29, 2021

(87) PCT Pub. No.: WO2020/240741
PCT Pub. Date: Dec. 3, 2020

(65) Prior Publication Data
US 2022/0224520 A1    Jul. 14, 2022

(51) Int. Cl.
*H04L 9/08* (2006.01)

(52) U.S. Cl.
CPC .......... *H04L 9/0825* (2013.01); *H04L 9/0827* (2013.01)

(58) Field of Classification Search
None
See application file for complete search history.

(56) References Cited

U.S. PATENT DOCUMENTS

| | | | |
|---|---|---|---|
| 9,641,328 B1* | 5/2017 | Bennett | H04L 9/0866 |
| 2002/0073229 A1* | 6/2002 | Hayashi | H04N 21/4147 |
| | | | 348/E5.002 |

(Continued)

OTHER PUBLICATIONS

Fujioka, Hoshino, Kobayashi, Suzuki, Ustaoglu, Yoneyama, "id-eCK Secure ID-Based Authenticated Key Exchange on Symmetric and Asymmetric Pairing", IEICE Transactions on Fundamentals of Electronics, Communications and Computer Sciences vol. E96-A No. 6 pp. 1139-1155, 2013.

(Continued)

*Primary Examiner* — Bassam A Noaman

(57) ABSTRACT

A key exchange system, for generating a shared key for performing encrypted communication between multiple communication devices, includes the multiple communication devices. Each of the multiple communication devices includes a memory, and a processor configured to generate a short term private key by using a private key, generate a short term public key on one of asymmetric pairing groups used for the ID based encryption, by using the short term private key, and generate a shared key for performing encrypted communication with another communication device by performing a first pairing operation using a private key generated on another one of the asymmetric pairing groups and a short term public key generated in the other communication device, and performing a second pairing operation using the short term private key of the communication device and public information used in generating a private key of the other communication device.

3 Claims, 6 Drawing Sheets

(56) References Cited

U.S. PATENT DOCUMENTS

| | | | | |
|---|---|---|---|---|
| 2006/0098824 A1* | 5/2006 | Mao | ................ | H04L 9/088 |
| | | | | 380/282 |
| 2016/0156462 A1* | 6/2016 | Winslow | ............ | H04L 9/0891 |
| | | | | 380/279 |
| 2017/0373841 A1* | 12/2017 | Nagai | .................. | G09C 1/00 |

OTHER PUBLICATIONS

B. LaMacchia, K. Lauter, and A. Mityagin, "Stronger Security of Authenticated Key Exchange," in Provable Security, ser. LNCS, vol. 4784. Springer, 2007, section 4.

* cited by examiner

KEY EXCHANGE SYSTEM, METHOD AND PROGRAM FOR GENERATING A SHARED KEY FOR SECURE COMMUNICATION

CROSS-REFERENCE TO RELATED APPLICATIONS

This application is a U.S. 371 Application of International Patent Application No. PCT/JP2019/021377, filed on 29 May 2019, the disclosure of which is hereby incorporated herein by reference in its entirety.

TECHNICAL FIELD

The present invention relates to a key exchange system, a communication device, a key exchange method, and a program.

BACKGROUND ART

In recent years, Internet of Things (IoT) devices have become ubiquitous, and highly important communications have become common even for IoT devices. Thus, authentication techniques for confirming whether the correct devices are being used during communication have become important even for IoT devices.

While passwords, electronic certificates, and the like are known in the art as authentication techniques for IoT devices, there has been a demand for the introduction of a more secure authenticated key exchange protocol in recent years. An authenticated key exchange protocol is a protocol that generates a key (shared key) that is common to each other upon successful authentication and enables encrypted communication with that shared key. As one such authenticated key exchange protocol, an authenticated key exchange protocol using an ID based encryption is known.

A model, called the id-eCK model, is known as a model of security that the authenticated key exchange protocol using the ID based encryption should meet, and is known as a model that requires very strong security.

The authenticated key exchange protocol using the ID based encryption is generally implemented by using a bilinear group in an elliptic curve on a finite field. Such a bilinear group is also referred to as a pairing group, and can be classified into a symmetric pairing group and an asymmetric pairing group. In recent years, such an asymmetric pairing group is often used in terms of efficiency and security in a case of using a pairing group for encryption. As an authenticated key exchange protocol using the ID based encryption implemented on an asymmetric pairing group, Fujioka-Suzuki-Ustaoglu (FSU), also standardized in International Organization for Standardization/International Electrotechnical Commission (ISO/IEC) is known (see NPL 1).

CITATION LIST

Non Patent Literature

NPL 1: Fujioka, Hoshino, Kobayashi, Suzuki, Ustaoglu, Yoneyama, "id-eCK Secure ID-Based Authenticated Key Exchange on Symmetric and Asymmetric Pairing", IEICE TRANSACTIONS on Fundamentals of Electronics, Communications and Computer Sciences Vol. E96-A No. 6 pp. 1139-1155, 2013.

SUMMARY OF THE INVENTION

Technical Problem

However, in FSU, a group operation called a pairing operation needs to be performed four times. Because a computational cost of the pairing operation is generally high, in a case where a device with limited computational resources such as an IoT device performs key exchange by FSU, the key exchange may be time-consuming.

An embodiment of the present invention has been made in view of the points described above, and an object of the present invention is to reduce the computational costs of the authenticated key exchange protocol using the ID based encryption.

Means for Solving the Problem

In order to achieve the object described above, a key exchange system according to an embodiment of the present invention is a key exchange system for generating a shared key for performing encrypted communication between a plurality of communication devices by an authenticated key exchange protocol using an ID based encryption, the key exchange system including the plurality of communication devices, wherein each of the plurality of communication devices includes a first generation unit configured to generate a short term private key by using a private key of the communication device, a second generation unit configured to generate a short term public key of the communication device on a pairing group $G_1$ of one of asymmetric pairing groups $G_1$ and $G_2$ used for the ID based encryption, by using the short term private key, and a third generation unit configured to generate a shared key for performing encrypted communication with another communication device by performing a first pairing operation using a private key of the communication device generated on the pairing group $G_2$ being another one of the asymmetric pairing groups $G_1$ and $G_2$ and a short term public key generated in the other communication device, and performing a second pairing operation using the short term private key of the communication device and public information used in generating a private key of the other communication device.

Effects of the Invention

The computational costs of the authenticated key exchange protocol using the ID based encryption can be reduced.

DESCRIPTION OF EMBODIMENTS

Hereinafter, an embodiment of the present invention will be described. The embodiment of the present invention describes a key exchange system 1 in which computational costs are reduced in an authenticated key exchange protocol using ID based encryption by reducing the number of times of pairing operation.

Overall Configuration

Figure 1:
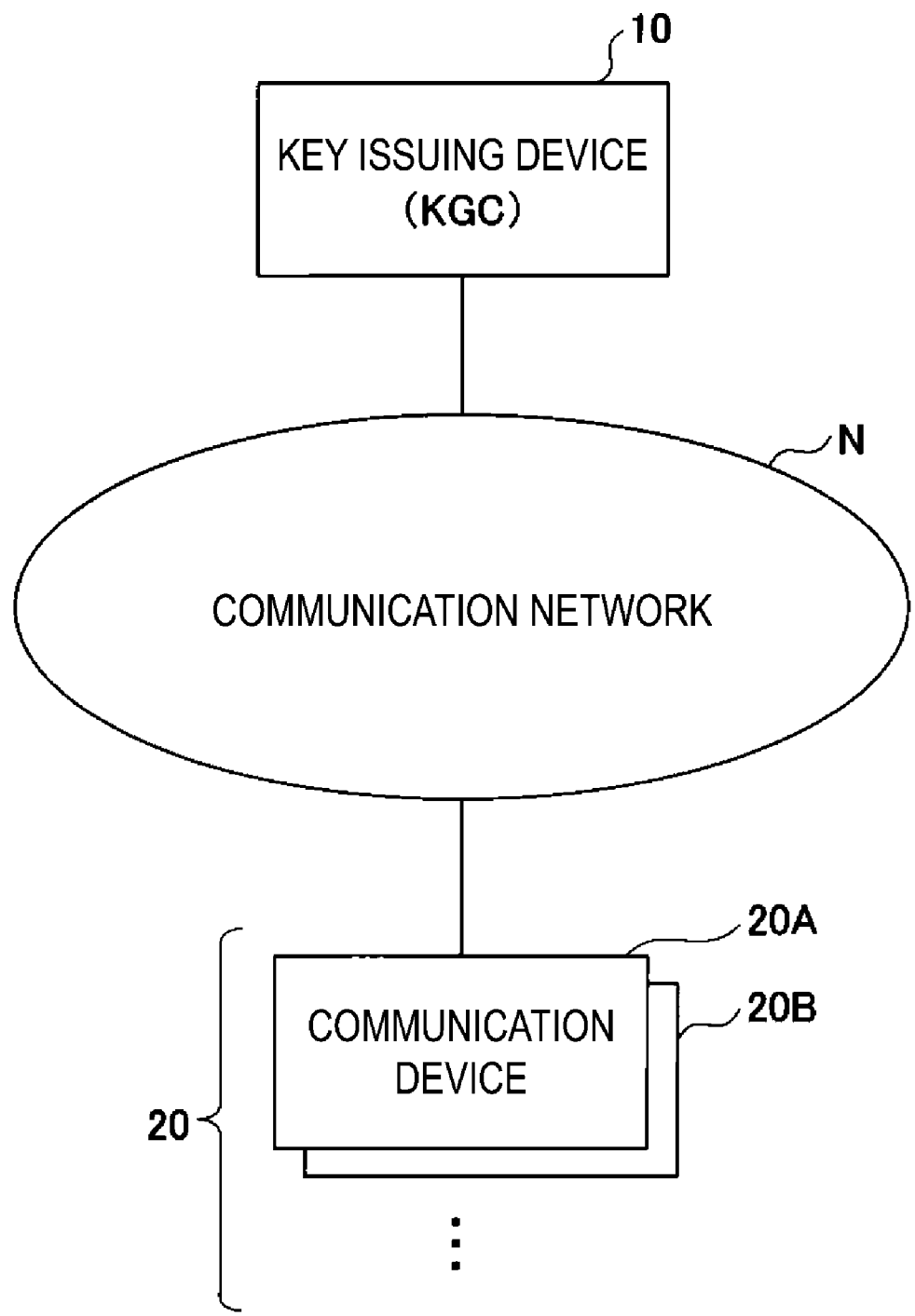
FIG. 1 is a diagram illustrating an example of an overall configuration of a key exchange system according to an embodiment of the present invention.

First, an overall configuration of the key exchange system 1 according to the embodiment of the present invention will be described with reference to FIG. 1. FIG. 1 is a diagram illustrating an example of the overall configuration of the key exchange system 1 according to the embodiment of the present invention.

As illustrated in FIG. 1, the key exchange system 1 according to the embodiment of the present invention includes a key issuing device 10 and a plurality of communication devices 20. The key issuing device 10 and each of the communication devices 20 are communicatively connected through a communication network N such as the Internet, for example.

The key issuing device 10 is a computer or computer system that functions as a Key Generation Center (KGC). The key issuing device 10 uses a master private key to generate a master public key in advance and publishes the master public key. In a case where the key issuing device 10 receives an identifier of a communication device 20, the key issuing device 10 generates a user private key from the identifier and distributes the user private key to the communication device 20 corresponding to the identifier.

Note that any identifier can be used as the identifier of the communication device 20. For example, a manufacture unique number, an Internet Protocol (IP) address, a physical address, and the like of the communication device 20 can be used as the identifier. In addition to these, for example, a user ID of the user of the communication device 20, the name of the user of the communication device 20, the mail address of the user of the communication device 20, or the like can be used as the identifier.

The communication device 20 is a variety of IoT devices such as, for example, various sensor devices, embedded devices, wearable devices, digital appliances, monitoring cameras, lighting devices, medical devices, industrial devices, and the like. The communication device 20 uses the user private key distributed from the key issuing device 10 to perform authentication (i.e., verification of legitimacy) with the authenticated key exchange protocol using the ID based encryption with another communication device 20 to exchange (generate) a key (shared key) for encrypted communication. Hereinafter, in a case where the plurality of communication devices 20 are expressed separately, the communication devices 20 are expressed as a "communication device 20A", a "communication device 20B", and the like.

Note that in the embodiment of the present invention, an IoT device is assumed as each communication device 20, and the computational resources of the communication device 20 are limited (i.e., the processing performance of the processor and the capacity of the memory are poor compared to a typical computer or the like, for example). However, no such limitation is intended, and the embodiment of the present invention can be similarly applied even if the communication device 20 is other than an IoT device (for example, a personal computer (PC), a server device, a smartphone, a tablet terminal, or the like).

The configuration of the key exchange system 1 illustrated in FIG. 1 is an example, and other configurations may be employed. For example, a terminal transmitting an identifier of each communication device 20 to the key issuing device 10 may be included in the key exchange system 1.

Hardware Configuration

Next, a hardware configurations of the key issuing device 10 and the communication device 20 according to the embodiment of the present invention will be described.

Key Issuing Device 10

Figure 2:
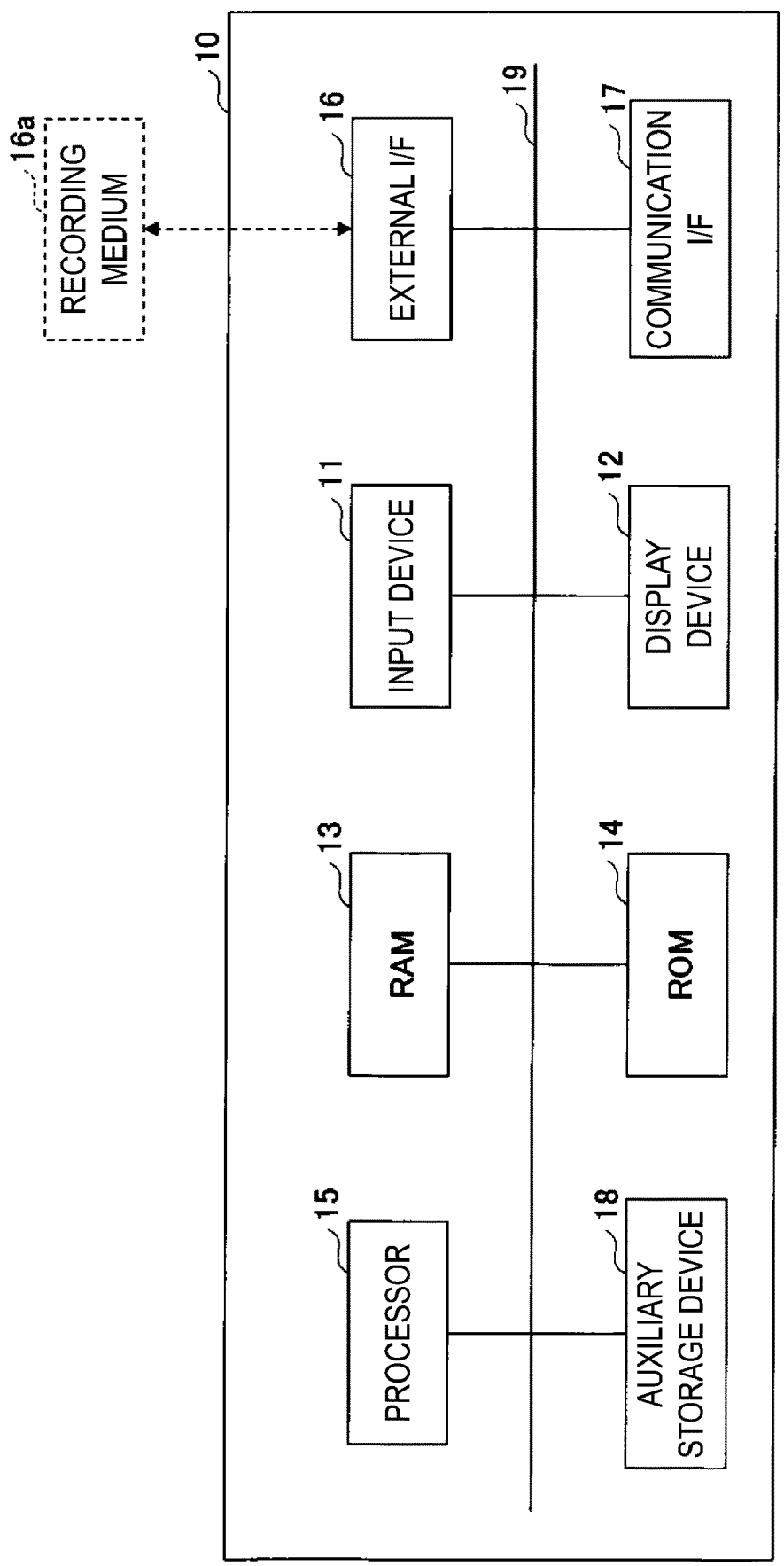
FIG. 2 is a diagram illustrating an example of a hardware configuration of a key issuing device according to the embodiment of the present invention.

Hereinafter, a hardware configuration of the key issuing device 10 according to the embodiment of the present invention will be described with reference to FIG. 2. FIG. 2 is a diagram illustrating an example of the hardware configuration of the key issuing device 10 according to the embodiment of the present invention.

As illustrated in FIG. 2, the key issuing device 10 according to the embodiment of the present invention includes an input device 11, a display device 12, a Random Access Memory (RAM) 13, a Read Only Memory (ROM) 14, a processor 15, an external I/F 16, a communication I/F 17, and an auxiliary storage device 18. The pieces of hardware are communicably connected through a bus 19.

The input device 11 is, for example, a keyboard, a mouse, a touch panel, and the like, and is used by the user to enter various operations. The display device 12 is, for example, a display and the like, and is used to display results of various processes and the like to the user. Note that the key issuing device 10 may not include at least one of the input device 11 and the display device 12.

The RAM 13 is a volatile semiconductor memory that temporarily retains a program and data. The ROM 14 is a non-volatile semiconductor memory that can retain a program and data even when the power is turned off. The processor 15 is, for example, a Central Processing Unit (CPU) and the like, and reads a program or data from the ROM 14, auxiliary storage device 18 and the like to the RAM 13 to execute a process.

The external I/F 16 is an interface to an external device. The external device is a recording medium 16a and the like. Examples of the recording medium 16a include a Compact Disc (CD), a Digital Versatile Disk (DVD), a Secure Digital memory card (SD memory card), and a Universal Serial Bus (USB) memory card. Note that one or more programs and the like that achieve each function of the key issuing device 10 may be recorded in the recording medium 16a.

The communication I/F 17 is an interface for connecting the key issuing device 10 to the communication network N. The key issuing device 10 can perform data communication with the communication device 20 through the communication I/F 17.

The auxiliary storage device 18 is a non-volatile storage device such as a Hard Disk Drive (HDD) and a Solid State Drive (SSD), for example. One or more programs and the like that achieve each function of the key issuing device 10 are stored in the auxiliary storage device 18.

The key issuing device 10 according to the embodiment of the present invention has the hardware configuration illustrated in FIG. 2 and thus can implement key issuing processing described below. Note that while the key issuing device 10 according to the embodiment of the present invention is implemented with a single device (computer) in FIG. 2, the present invention is not limited to this. The key issuing device 10 according to the embodiment of the present invention may be implemented with a plurality of devices (computers). The single device (computer) may include a plurality of processors 15, and a plurality of memories (for example, the RAM 13, the ROM 14, the auxiliary storage device 18 and the like).

Communication Device 20

Figure 3:
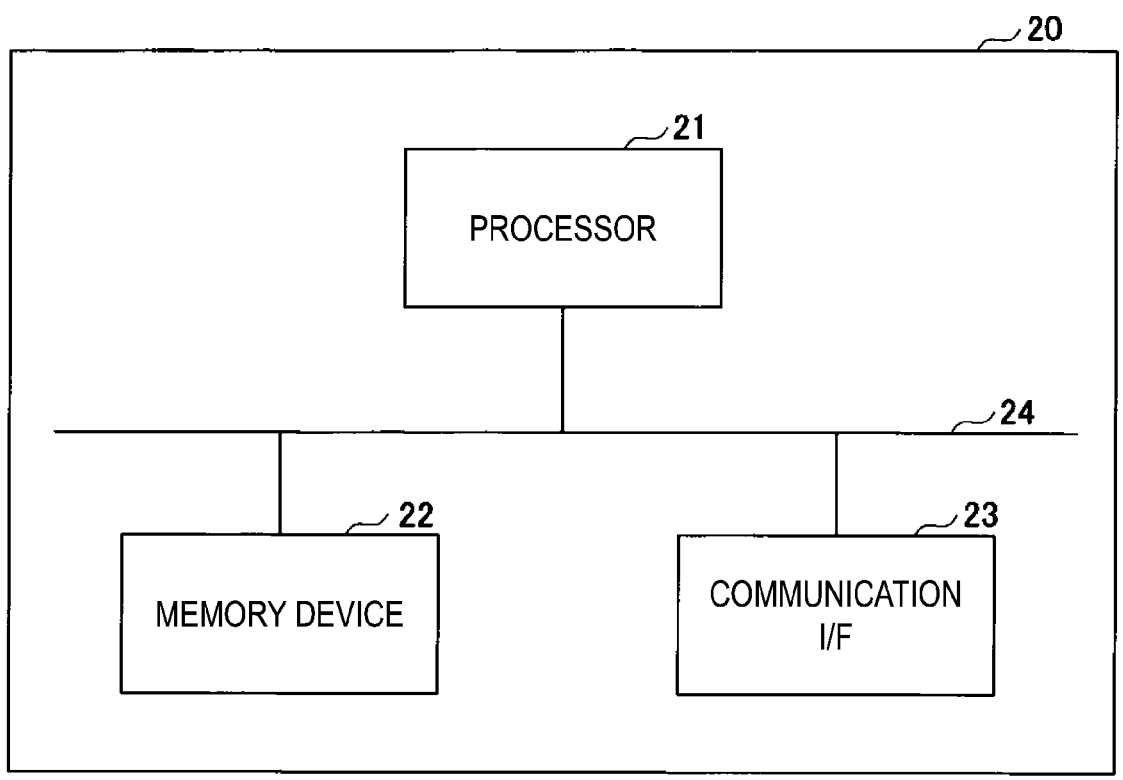
FIG. 3 is a diagram illustrating an example of a hardware configuration of a communication device according to the embodiment of the present invention.

Hereinafter, a hardware configuration of the communication device 20 according to the embodiment of the present invention will be described with reference to FIG. 3. FIG. 3 is a diagram illustrating an example of the hardware configuration of the communication device 20 according to the embodiment of the present invention.

As illustrated in FIG. 3, the communication device 20 in the embodiment of the present invention includes a processor 21, a memory device 22, and a communication I/F 23. The pieces of hardware are communicatively connected through a bus 24.

The processor 21 is, for example, a Micro Processing Unit (MPU), a CPU, or the like, and is an arithmetic device that reads a program or data from the memory device 22 to execute processing.

The memory device 22 is, for example, a RAM, ROM, flash memory, or the like, and stores various pieces of data, programs, and the like. One or more programs and the like that achieve each function of the communication device 20 according to the embodiment of the present invention are stored in the memory device 22.

The communication I/F 23 is an interface for connecting the communication device 20 to the communication network N. The communication device 20 can perform data communication with other communication devices 20, the key issuing device 10, or the like through the communication I/F 23.

The communication device 20 according to the embodiment of the present invention has the hardware configuration illustrated in FIG. 3 and thus can implement key exchange processing described below.

Functional Configuration

Figure 4:
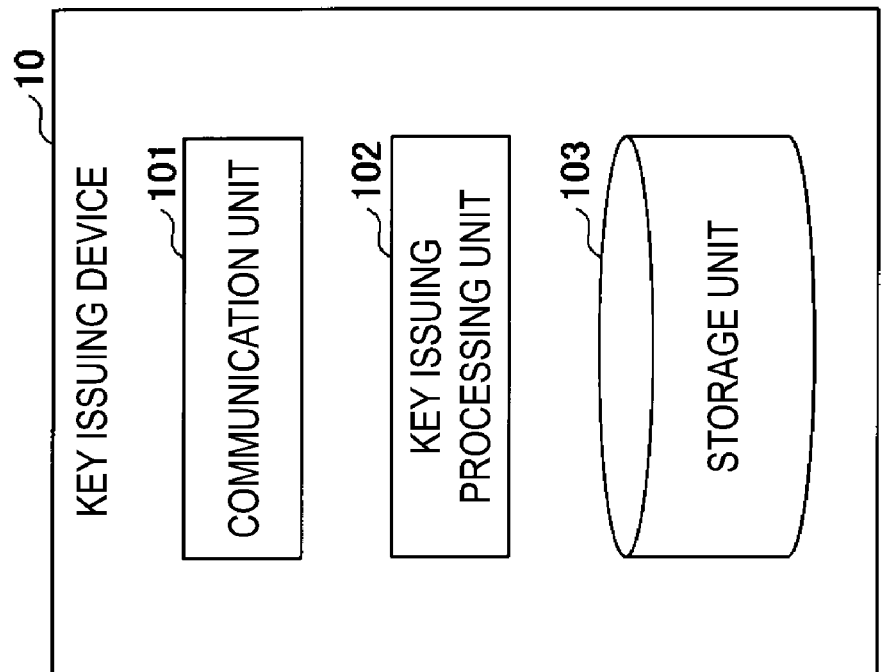
FIG. 4 is a diagram illustrating an example of a functional configuration of the key exchange system according to the embodiment of the present invention.
Figure 4:
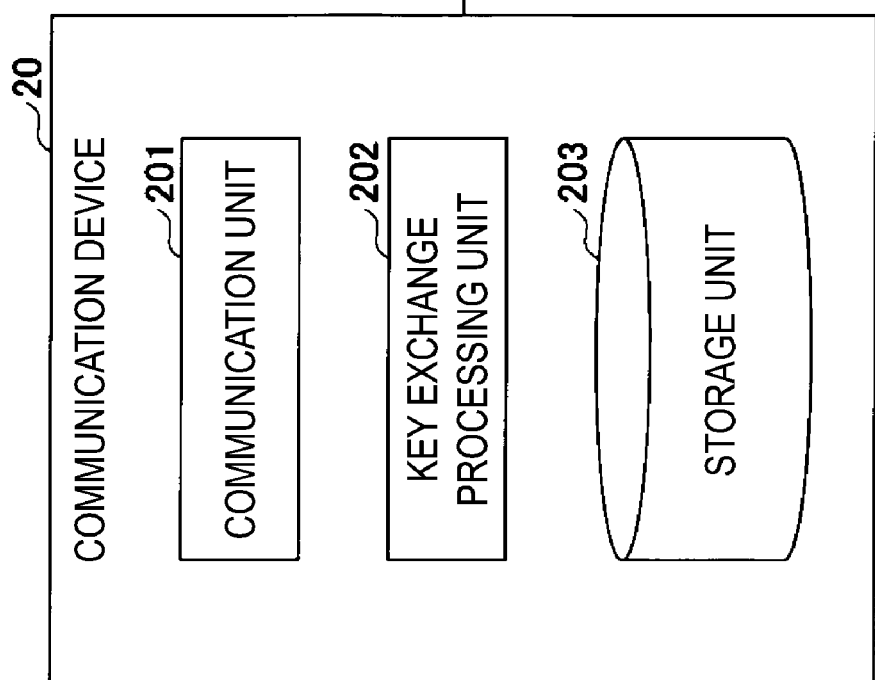

Next, a functional configuration of the key exchange system 1 according to the embodiment of the present invention will be described with reference to FIG. 4. FIG. 4 is a diagram illustrating an example of the functional configuration of the key exchange system 1 according to the embodiment of the present invention.

Key Issuing Device 10

As illustrated in FIG. 4, the key issuing device 10 according to the embodiment of the present invention includes a communication unit 101 and a key issuing processing unit 102. These units are achieved by processes that one or more programs installed in the key issuing device 10 cause the processor to execute.

The key issuing device 10 according to the embodiment of the present invention includes a storage unit 103. The storage unit 103 can be implemented using, for example, the auxiliary storage device 18 or the like. Note that the storage unit 103 may be implemented using, for example, a storage device connected to the key issuing device 10 via the communication network N.

The communication unit 101 performs various communications with the communication device 20 and the like. In a case where the key issuing processing unit 102 receives the identifier of the communication device 20, the key issuing processing unit 102 generates a user private key from the identifier and distributes the user private key to the communication device 20 corresponding to the identifier. The storage unit 103 stores various pieces of data (e.g., a master public key, a master private key, and the like).

Communication Device 20

As illustrated in FIG. 4, the communication device 20 according to the embodiment of the present invention includes a communication unit 201 and a key exchange processing unit 202.

The communication unit 201 performs various communications with other communication devices 20, the key issuing device 10, and the like. The key exchange processing unit 202 uses the user private key distributed from the key issuing device 10 to perform authentication with another communication device 20 by the authenticated key exchange protocol using the ID based encryption to exchange the shared key. The storage unit 203 stores various pieces of data (e.g., a user private key, or the like).

Details of Processing of Key Exchange System 1

Next, details of processing of the key exchange system 1 according to the embodiment of the present invention will be described.

Definition of Symbols

First, the symbols used hereinafter are defined as follows.
$ID_A$: Identifier of communication device 20A
$ID_B$: Identifier of the communication device 20B
$D_A$: User private key of the communication device 20A
$D_B$: User private key of the communication device 20B
k: Security parameter
p, q: Prime numbers satisfying p≠q
$G_1$: Partial group of a group $E(F_p)$ on an elliptic curve $E_1$, where the elliptic curve E1 is an elliptic curve on finite field $F_p$
$G_2$: Partial group of a group expressed by Math. 1 on an elliptic curve $E_2$, where the elliptic curve $E_2$ is an ellipse curve on k-th extension field of finite field $F_p$ $$E(F_{p^k}) \qquad [\text{Math. 1}]$$

$g_1$: Generator of $G_1$
$g_2$: Generator of $G_2$
$Z_q$: Residue class modulo q
$Z \in Z_q$: Master private key
$Z = zg_1$: Master public key
$H_1$: Function generating an element on $G_2$ from a string (e.g., an octet sequence)
$H_2$: Function generating an element on $Z_q$ from a string
H: Key derivation function
e: Pairing operation defined on $G_1 * G_2$
Here, among each of the symbols defined above, the symbols other than the master private key z, and the user private keys $D_A$ and $D_B$ are assumed to be publicly available information. Note that $G_1$ and $G_2$ may be reversed. In a case that an element of the group or an element on the $Z_q$ are input to a function, a string representing the element is assumed to be input to the function.

Key Issuing Processing

Figure 5:
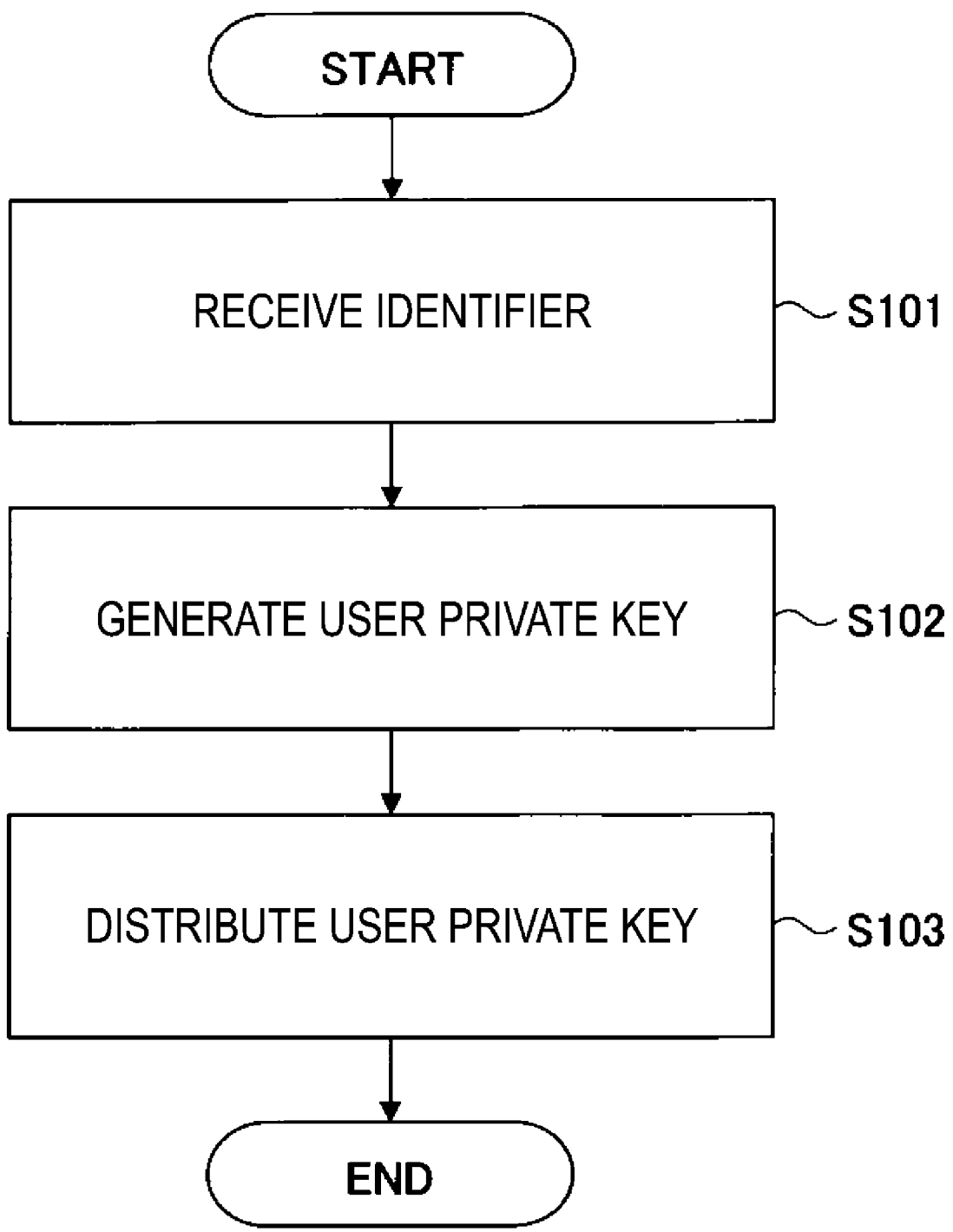
FIG. 5 is a flowchart illustrating an example of key issuing processing according to the embodiment of the present invention.

First, key issuing processing for generating a user private key will be described with reference to FIG. 5. FIG. 5 is a flowchart illustrating an example of the key issuing processing according to the embodiment of the present invention. Hereinafter, as an example, a case in which the user private key $D_A$ and the user private key $D_B$ are issued will be described.

The key issuing processing unit 102 receives the identifier $ID_A$ of the communication device 20A and the identifier $ID_B$ of the communication device 20B (step S101). The identifier of the communication device 20 may, for example, be transmitted from the communication device 20, may be transmitted from a terminal or the like connected to the key issuing device 10 via the communication network N, or may be input from the input device 11 included in the key issuing device 10.

Next, the key issuing processing unit 102 generates the user private key $D_A$ and the user private key $D_B$ as described below (step S102).

$$Q_A = H_1(ID_A) \in G2$$
$$D_A = zQ_A$$
$$Q_B = H_1(ID_B) \in G2$$
$$D_B = zQ_B$$

Here, $Q_A$ and $Q_B$ may be generated by the communication device 20 or by the key issuing device 10. That is, for example, in generating the user private key $D_A$, the communication device 20 may generate the $Q_A$ and publish the $Q_A$ to the key issuing device 10 or the key issuing device 10 may generate the $Q_A$. Similarly, for example, in generating the user private key $D_B$, the communication device 20 may generate the $Q_B$ and publish the $Q_B$ to the key issuing device 10 or the key issuing device 10 may generate the $Q_B$. Note that it is convenient to respectively generate the $Q_A$ and $Q_B$ at the communication device 20A and the communication device 20B, but it is preferable to generate the QA and QB at the key issuing device 10, for example, in a case where computational resources of the communication devices 20 are limited, and many computational resources are required in the calculation of $H_1$.

Next, the key issuing processing unit 102 distributes the user private key $D_A$ to the communication device 20A and the user private key $D_B$ to the communication device 20B (step S103). Note that the key issuing processing unit 102 may distribute the user private key in any manner. For example, the key issuing processing unit 102 may distribute the user private key by transmitting, by the communication unit 101, a corresponding user private key to each communication device 20 in response to a distribution request for the user private key from the communication device 20. Alternatively, the user private key may be recorded in a recording medium or the like and then distributed to the communication device 20. In this way, each communication device 20 can obtain a user private key that is used in exchanging (generating) a shared key with other communication devices 20.

Key Exchange Processing

Figure 6:
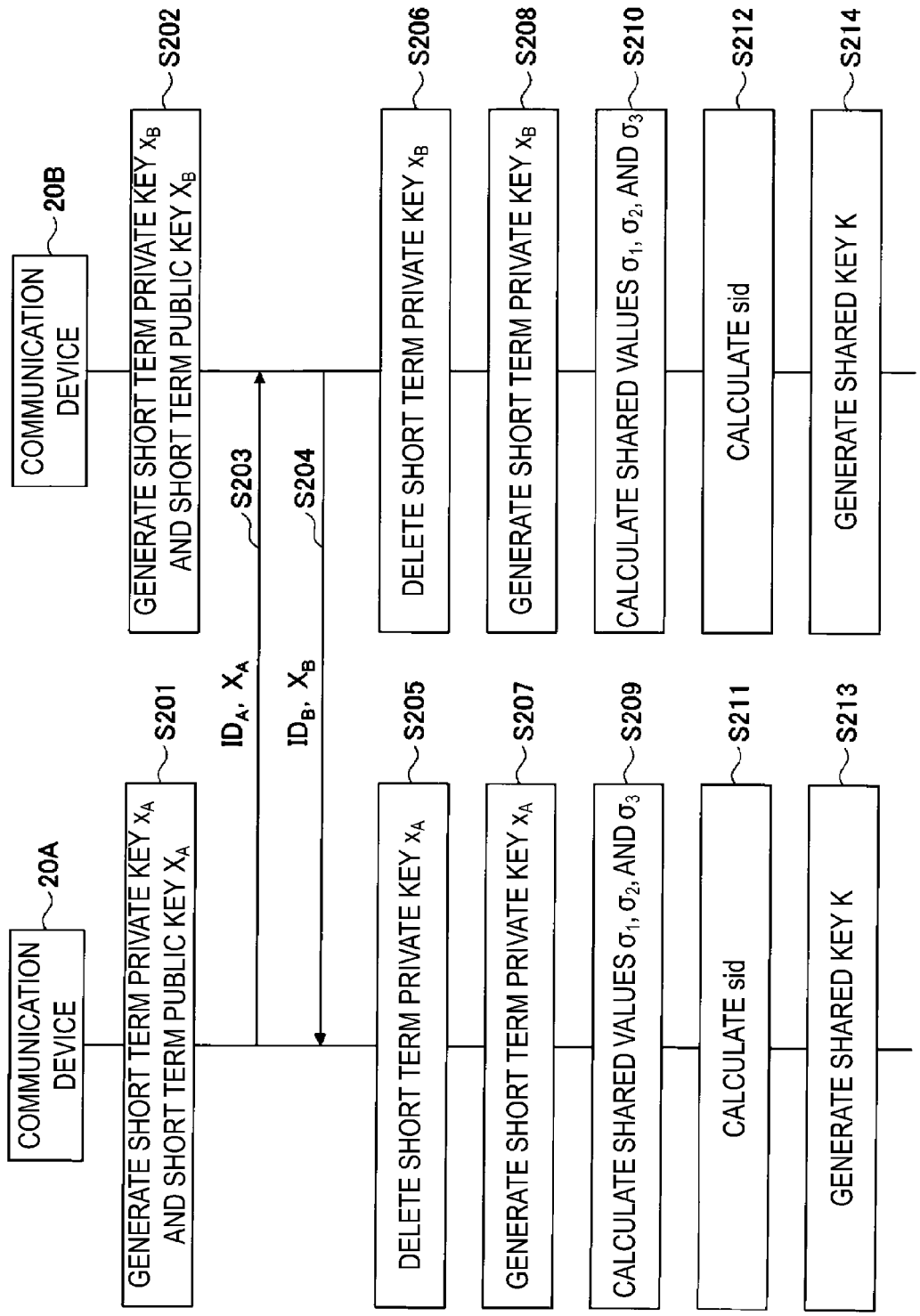
FIG. 6 is a sequence diagram illustrating an example of key exchange processing according to the embodiment of the present invention.

Next, key exchange processing for exchanging a shared key by performing authentication between the communication devices 20 by an authenticated key exchange protocol using the ID based encryption will be described with reference to FIG. 6. FIG. 6 is a sequence diagram illustrating an example of the key exchange processing according to the embodiment of the present invention. Hereinafter, as an example, a case in which the shared key is exchanged (generated) between the communication device 20A and the communication device 20B will be described.

The key exchange processing unit 202 of the communication device 20A randomly selects $r_A \in Z_q$ and then generates a short term private key $$x_A = H_2(D_A \| r_A) \qquad [\text{Math. 2}]$$

where, ∥: string coupling and generates a short term public key $X_A = x_A g_1$ (step S201). Note that the short term private key $x_A$ and the short term public key $X_A$ are stored in the storage unit 203 of the communication device 20A.

Similarly, the key exchange processing unit 202 of the communication device 20B randomly selects $r_B \in Z_q$ and then generates a short term private key $$x_B = H_2(D_B \| r_B) \qquad [\text{Math. 3}]$$

and generates a short term public key $X_B = x_B g_1$ (step S202). Note that the short term private key $x_B$ and the short term public key $X_B$ are stored in the storage unit 203 of the communication device 20B.

Next, the communication unit 201 of the communication device 20A transmits the identifier $ID_A$ and the short term public key $X_A$ to the communication device 20B (step S203). Similarly, the communication unit 201 of the communication device 20B transmits the identifier $ID_B$ and the short term public key $X_B$ to the communication device 20B (step S204). In this way, the identifiers and the short term public keys are exchanged between the communication devices 20.

Next, the key exchange processing unit 202 of the communication device 20A deletes the short term private key $x_A$ generated in step S201 described above from the storage unit 203 (step S205). Similarly, the key exchange processing unit 202 of the communication device 20B deletes the short term private key $x_B$ generated in step S202 described above from the storage unit 203 (step S206).

Note that while the short term private key $x_A$ and the short term private key $x_B$ have been deleted in step S205 and step S206 described above, it is to prevent the short term private keys from leaking before receiving the identifier and the short term public key from the other communication device 20. That is, for example, after the communication device 20A transmits the identifier $ID_A$ and the short term public key $X_A$ to the communication device 20B, a certain amount of time may be required before the time that the communication device 20A receives the identifier $ID_B$ and the short term public key $X_B$ from the communication device 20B. Thus, in order to prevent the short term private key $x_A$ from leaking during this time, the communication device 20A deletes the short term private key $x_A$ after transmitting the identifier $ID_A$ and the short term public key $X_A$ to the communication device 20B. This similarly applies to why the short term private key $x_B$ is deleted.

Subsequently, the key exchange processing unit 202 of the communication device 20A regenerates a short term private key $$x_A = H_2(D_A \| r_A) \qquad [\text{Math. 4}]$$

(step S207). Note that the short term private key $x_A$ is stored in the storage unit 203 of the communication device 20A.

Similarly, the key exchange processing unit 202 of the communication device 20B regenerates a short term private key $$x_B = H_2(D_B \| r_B) \qquad \text{[Math. 5]}$$

(step S208). Note that the short term private key $x_B$ is stored in the storage unit 203 of the communication device 20B.

Next, the key exchange processing unit 202 of the communication device 20A calculates a shared value $\sigma_1$, a shared value $\sigma_2$, and a shared value $\sigma_3$ as described below (step S209).

$$\sigma_1 = e(X_B, D_A)$$
$$\sigma_2 = e(x_A Z, Q_B)$$
$$\sigma_3 = x_A X_B$$

Similarly, the key exchange processing unit 202 of the communication device 20B calculates a shared value $\sigma_1$, a shared value $\sigma_2$, and a shared value $\sigma_3$ as described below (step S210).

$$\sigma_1 = e(x_B Z, Q_A)$$
$$\sigma_2 = e(X_A, D_B)$$
$$\sigma_3 = x_B X_A$$

Next, the key exchange processing unit 202 of the communication device 20A calculates an sid as described below (step S211). Note that the sid refers to a session ID.

$$sid = (ID_A \| ID_B \| X_A \| X_B) \qquad \text{[Math. 6]}$$

Similarly, the key exchange processing unit 202 of the communication device 20B calculates an sid as described below (step S212).

$$sid = (ID_A \| ID_B \| X_A \| X_B) \qquad \text{[Math. 7]}$$

Note that in step S211 and step S212 described above, it is necessary for the sids to be the same between the communication device 20A and the communication device 20B, and thus, for example, the sids may be the same by predetermining the sender as $ID_A$ and the receiver as $ID_B$, or the like, in performing encrypted communication, or the sids may be the same by sorting and coupling $ID_A$, $ID_B$, $X_A$, and $X_B$ in alphabetical order. At this time, in addition to $ID_A$, $ID_B$, $X_A$, and $X_B$, for example, a master public key Z may be added, or a protocol name, an algorithm name, or the like may be added.

Finally, the key exchange processing unit 202 of the communication device 20A generates a shared key K as described below (step S213).

$$K = H(\sigma_1 \| \sigma_2 \| \sigma_3 \| sid) \qquad \text{[Math. 8]}$$

Note that the shared key K is stored in the storage unit 203 of the communication device 20A.

Similarly, the key exchange processing unit 202 of the communication device 20B generates a shared key K as described below (step S214).

$$K = H(\sigma_1 \| \sigma_2 \| \sigma_3 \| sid) \qquad \text{[Math. 9]}$$

Note that the shared key K is stored in the storage unit 203 of the communication device 20B.

As a result, the shared key K is shared between the communication device 20A and the communication device 20B. Thus, the shared key K can be used to perform encrypted communication between the communication device 20A and the communication device 20B.

As described above, in the embodiment of the present invention, protocols are designed to enable the technology of a secure NAXOS protocol in an eCK model in a normal authenticated key exchange to be applied to an authenticated key exchange protocol using the ID based encryption. Note that the eCK model is a model of security in a normal authenticated key exchange and is an original model of the id-eCK model.

Meanwhile, a pairing operation is not required in a normal authenticated key exchange, and the NAXOS protocol is a protocol on a normal cyclic group. Thus, it is necessary to configure the protocol on a pairing group in order to perform an authenticated key exchange using the ID based encryption, and there is a problem of how to apply the NAXOS technology because there are two cyclic groups $G_1$ and $G_2$ in an asymmetric pairing group. In contrast, in the embodiment of the present invention, $G_1$ is used for operation on temporary keys (i.e., a short term private key and a short term public key) and $G_2$ is used for an element of the user private key to achieve security (i.e., security that meets the id-eCK model). Note that the NAXOS protocol is an authenticated key exchange protocol with a higher security than security in the CK model, using the technique of computing a hash function value with the user private key and the short term private key as input to create a short term public key. The details of the NAXOS protocol are described in, for example, the reference literature "B. LaMacchia, K. Lauter, and A. Mityagin, "Stronger Security of Authenticated Key Exchange," in Provable Security, ser. LNCS, vol. 4784. Springer, 2007." section 4 and the like.

In the embodiment of the present invention, the shared key K can be exchanged by simply performing a pairing operation twice by each communication device 20. Meanwhile, as described above, for example, a pairing operation must be performed four times in the FSU. Thus, in the embodiment of the present invention, each communication device 20 is capable of performing key exchange in about half the time in the known art. Thus, according to the embodiment of the present invention, it is possible to perform an authenticated key exchange protocol using the ID based encryption at high speeds even in, for example, an IoT device with limited computational resources.

The present invention is not limited to the specifically disclosed embodiment described above, and various modifications and changes can be made without departing from the scope of the claims.

REFERENCE SIGNS LIST

1 Key exchange system
10 Key issuing device
20 Communication device

101 Communication unit
102 Key issuing processing unit
103 Storage unit
201 Communication unit
202 Key exchange processing unit
203 Storage unit

The invention claimed is:

1. A key exchange system for generating a shared key for performing encrypted communication between a plurality of communication devices by an authenticated key exchange protocol using an ID based encryption, the key exchange system comprising:
the plurality of communication devices,
wherein each of the plurality of communication devices includes:
a memory, and
a processor configured to:
generate a short term private key by using a private key of a communication device,
generate a short term public key of the communication device using the short term private key and a pairing group $G_1$ being one of asymmetric pairing groups $G_1$ and $G_2$ used for the ID based encryption, and
generate a shared key for performing encrypted communication with another communication device by performing a first pairing operation using the private key of the communication device and a short term public key generated in the other communication device, and performing a second pairing operation using the short term private key of the communication device and public information used in generating a private key of the other communication device,
wherein the private key of the communication device is generated using the pair group $G_2$ being another one of the asymmetric pairing groups $G_1$ and $G_2$, and
wherein the processor is further configured to:
randomly select an element of a residue class $Z_q$ with q as a prime number to generate the short term private key using a predetermined function having, as an input, a string obtained by coupling string representing the selected element and the private key of the communication device;
generate the short term public key by computing the short term private key and the pairing group $G_1$; and
generate the shared key by using a computation result of the first pairing operation, a computation result of the second pairing operation, a result of computing the short term private key and the short term public key generated in the other communication device, and a shared session ID between the communication device and the other communication device.

2. A communication device for generating a shared key for performing encrypted communication with another communication device by an authenticated key exchange protocol using an ID based encryption, the communication device comprising:
a memory; and
a processor configured to:
generate a short term private key by using a private key of the communication device;
generate a short term public key of the communication device using the short term private key and a pairing group $G_1$ being one of asymmetric pairing groups $G_1$ and $G_2$ used for the ID based encryption; and
generate a shared key for performing encrypted communication with the other communication device by performing a first pairing operation using the private key of the communication device and a short term public key generated in the other communication device, and performing a second pairing operation using the short term private key of the communication device and public information used in generating a private key of the other communication device,
wherein the private key of the communication device is generated using the pairing group $G_2$ being another one of the asymmetric pairing groups $G_1$ and $G_2$, and
wherein the processor is further configured to:
randomly select an element of a residue class $Z_q$ with q as a prime number to generate the short term private key using a predetermined function having, as an input, a string obtained by coupling strings representing the selected element and the private key of the communication device;
generate the short term public key by computing the short term private key and the pairing group $G_1$; and
generate the shared key by using a computation result of the first pairing operation, a computation result of the second pairing operation, a result of computing the short term private key and the short term public key generated in the other communication device, and a shared session ID between the communication device and the other communication device.

3. A key exchange method for generating a shared key for performing encrypted communication between a plurality of communication devices by an authenticated key exchange protocol using an ID based encryption, the key exchange method comprising, performed by each of the plurality of communication devices:
generating a short term private key by using a private key of a communication device;
generating a short term public key of the communication device using the short term private key and a pairing group $G_1$ being one of asymmetric pairing groups $G_1$ and $G_2$ used for the ID based encryption; and
generating a shared key for performing encrypted communication with another communication device by performing a first pairing operation using the private key of the communication device and a short term public key generated in the other communication device, and performing a second pairing operation using the short term private key of the communication device and public information used in generating a private key of the other communication device,
wherein the private key of the communication device is generated using the pairing group $G_2$ being another one of the asymmetric pairing groups $G_1$ and $G_2$, and
wherein the method is further configured to:
randomly select an element of a residue class $Z_q$ with q as a prime number to generate the short term private key using a predetermined function having, as an input, a string obtained by coupling strings representing the selected element and the private key of the communication device;
generate the short term public key by computing the short term private key and the pairing group $G_1$; and
generate the shared key by using a computation result of the first pairing operation, a computation result of the second pairing operation, a result of computing the short term private key and the short term public key generated in the other communication device, and a shared session ID between the communication device and the other communication device.

* * * * *